Figure 1:
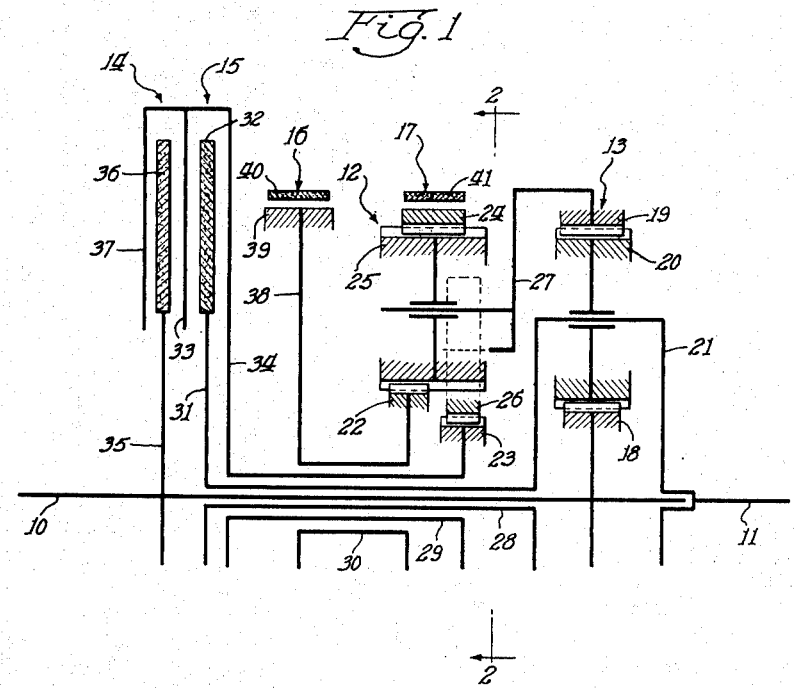

Sept. 21, 1954  J. W. HOLDEMAN  2,689,490
TRANSMISSION
Filed July 31, 1951

Inventor:
John W. Holdeman
By: Frank C. Parker
Atty.

Patented Sept. 21, 1954

2,689,490

UNITED STATES PATENT OFFICE 2,689,490

TRANSMISSION

John W. Holdeman, Detroit, Mich., assignor to Borg-Warner Corporation, Chicago, Ill., a corporation of Illinois Application July 31, 1951, Serial No. 239,555

16 Claims. (Cl. 74—761)

1

The present invention relates generally to transmissions and more particularly to truck transmissions employing compound planetary gearing.

The principal object of the present invention is to provide a planetary gearing type transmission suitable for use in trucks which will provide four forward speed driving ratios between the input and output shafts and a single reverse drive between these shafts and which employs a minimum of clutches and brakes for completing the different drives between the input and output shafts.

More specifically, it is an object of the present invention to provide a planetary gearing type transmission which employs two selectively operable clutches and two selectively operable brakes which are selectively engageable in pairs in order to effect four different forward driving ratios through the transmission and a single reverse driving ratio through the transmission.

A specific advantage of the present transmission over a transmission of the type disclosed in the copending application of G. E. Whelpley, Serial No. 228,046, filed May 24, 1951, for example, is that the present transmission is far easier to construct and assemble. In the present transmission two planetary gear sets are employed, making it unnecessary to utilize a compound planetary gear carrier, such as is disclosed in the copending Whelpley application. Further, it is unnecessary in the present transmission design to employ undercut planetary pinion gears which, of course, are rather expensive to manufacture.

Although the drawing accompanying the present description comprises merely a schematic showing of the transmission, it is contemplated that the different clutches and brakes may be selectively engaged in any desired manner. For example, it is intended that fluid pressure operated means may be employed for effecting engagement of the different clutches and brakes. It is also considered to be within the realm of the present invention to utilize positive brakes and clutches in place of the friction brakes and clutches shown schematically herein.

Figure 2:
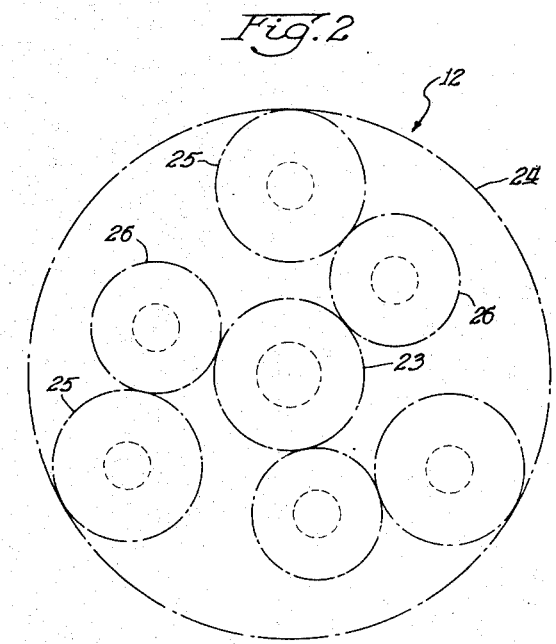

The above and numerous other objects and advantages of the present invention will become apparent from the following detailed description when read in conjunction with the accompanying drawings, wherein:

Fig. 1 represents a schematic illustration of the present transmission mechanism; and Fig. 2 is a schematic sectional view taken substantially along the line 2—2 of Fig. 1 and looking in the direction of the arrows.

2

With reference now to the drawings, wherein like reference numerals in the different figures identify identical parts therein, the present transmission comprises, in general, a drive shaft 10, a driven shaft 11, a front planetary gear set 12, a rear planetary gear set 13, a front friction clutch 14, a rear friction clutch 15, a front friction brake 16 and a rear friction brake 17.

The rear planetary gear set 13 comprises a sun gear 18, a ring gear 19, a plurality of planetary pinions 20 which mesh respectively with the sun gear 18 and the ring gear 19, and a planetary pinion carrier 21 for rotatably mounting the pinions 20. The planetary pinion carrier 21 is fixed to the driven shaft 11 for rotation in unison therewith.

The planetary gear set 12 comprises a sun gear 22, a sun gear 23, a ring gear 24, a plurality of planetary pinions 25 which mesh respectively with the sun gear 22 and the ring gear 24, a plurality of planetary pinions 26 which mesh respectively with the sun gear 23 and with the pinions 25, and a planetary pinion carrier 27 for rotatably mounting all of the pinions 25 and 26.

The drive shaft 10 is integral with the sun gear 18 and consequently continuously drives the sun gear 18. Mounted concentrically around the drive shaft 10 are a plurality of sleeve shafts 28, 29 and 30. The sleeve shaft 28 is integrally formed with the carrier 21 and consequently rotates in unison with the driven shaft 11. Secured to the shaft 28 is a flange 31 and this flange is formed integrally with an annular friction clutch plate 32 which forms part of the friction clutch 15. The friction clutch 15 may be engaged by forcing the friction plate 32 against an inwardly extending flange 33 carried by a flange 34 integrally secured to the intermediate shaft 29. Consequently, upon engagement of the clutch 15 the sun gear 23 is connected for rotation in unison with the planet pinion carrier 21.

The friction clutch 14 is provided for connecting the sun gear 23 directly to the drive shaft 10 and this clutch comprises a flange 35 integrally formed on the drive shaft 10 and carrying an annular friction clutch plate 36. Engagement of the friction clutch 14 so as to transmit a drive directly from the drive shaft 10 to the sun gear 23 is effected by moving the friction clutch plate 36 into engagement with either the flange 33 or a flange 37 which is also carried by the flange 34 on the sleeve shaft 29.

The sun gear 22 is integrally formed on the sleeve shaft 30 and this shaft has a radially extending flange 38 integrally secured or splined to a brake drum 39. The brake drum 39 constitutes the rotatable element of the friction brake 16 which also includes a retractable brake band 40 that is retractable into engagement with the brake drum 39 in order to hold the sun gear 22 stationary.

The outer periphery of the ring gear 24 comprises a brake drum which is designed to be engaged by a retractable brake band 41 which constitutes the stationary element of the friction brake 17.

The present transmission provides four forward speed drives and one reverse drive between the drive shaft 10 and the driven shaft 12 and the following table shows which clutches 14 and 15 and which brakes 16 and 17 are engaged and which are disengaged during the establishment of each of the drives through the transmission.

|  | Clutches | | Brakes | |
| --- | --- | --- | --- | --- |
|  | 14 | 15 | 16 | 17 |
| First | Off | Off | On | On |
| Second | Off | On | On | Off |
| Third | On | Off | On | Off |
| Direct | On | On | Off | Off |
| Reverse | On | Off | Off | On |

From the above table it is apparent that during the first or lowest forward speed drive through the present transmission, both brakes 16 and 17 are engaged whereas both clutches 14 and 15 are disengaged. Engagement of the brake 16 causes the sun gear 22 to be held stationary while engagement of the brake 17 causes the ring gear 24 to be held stationary. Consequently, since two elements namely, the sun gear 22 and the ring gear 24, are held stationary the entire planetary gear set 12 is also stationary and inasmuch as the ring gear 19 of the planetary gear set 13 is directly connected with the planetary gear carrier 27, this ring gear 19 is also stationary. Therefore the first or lowest forward speed drive through the present transmission utilizes the ring gear 19 as a reaction element and the drive proceeds from the drive shaft 10 through the sun gear 18 which, being driven in a forward direction, causes the planetary pinion carrier 21 to be rotated forwardly at an underdrive. The underdrive rotation of the carrier 21 causes the output or driven shaft 11 to be driven forwardly at an underdrive with respect to the speed of rotation of the drive shaft 10.

Second forward speed drive through the present transmission is established upon the engagement of the clutch 15 and brake 16 while the clutch 14 and brake 17 are disengaged. Engagement of the brake 16 causes the sun gear 22 to be held stationary and engagement of the clutch 15 causes the sun gear 23 and the planet gear carrier 21 to be locked together for rotation in unison. The drive during second forward speed drive is similar to that during the low forward speed drive except that the ring gear 19, at this time, rotates slowly forwardly to thereby increase the ratio between the drive shaft 10 and the driven shaft 11. During second forward speed drive the reaction sun gear 22 causes the front planetary gear set 12 to prevent reverse rotation of the ring gear 19. Therefore, forward rotation of the sun gear 18 causes the planet pinion carrier 21 to be rotated forwardly. Since the carrier 21 is connected with the input sun gear 23 at this time, through the medium of the friction clutch 15, the sun gear 23 is also rotated forwardly. The forward rotation of the sun gear 23 causes the pinions 26 to be rotated reversely axially and they in turn impart a forward axial rotation to the pinions 25. Forward axial rotation of the pinions 25 causes these pinions to planetate in a forward direction around the sun gear 22. This forward planetation of the pinions 25 is transmitted to the ring gear 19 through the carrier 27, thereby causing the ring gear 19 to rotate forwardly at a slow speed. Consequently, during second forward speed drive the sun gear 18 is rotating forwardly at engine speed while the ring gear 19 is rotating forwardly at a reduced speed so that the net effect is to cause the carrier 21 and driven shaft 11 to be rotated in a forward direction at a higher speed ratio than during low forward speed drive.

Third forward speed drive through the transmission may be established by engaging the clutch 14 and brake 16 while the clutch 15 and the brake 17 are disengaged. The sun gear 18 is of course driven at engine speed during this driving ratio, but the engagement of the clutch 14 causes the sun gear 23 to also be driven forwardly at engine speed. This forward rotation of the sun gear 23, while the sun gear 22 is held stationary by the brake 16 causes the ring gear 19 of the rear planetary gear set 13 to be driven forwardly at a reduced drive but at a slightly higher speed than the forward speed thereof during the establishment of second forward speed drive through the transmission. Consequently, during third forward speed drive through the transmission the sun gear 18 is driven forwardly at engine speed while the ring gear 19 is driven forwardly at a reduced speed, which is greater than the speed at which it is driven during second forward speed drive, and the net effect is to drive the planetary pinion carrier 21 and the driven shaft 11 forwardly at a higher ratio than the second forward speed driving ratio.

Direct or fourth forward speed drive through the present transmission is established upon the engagement of both clutches 14 and 15 and the disengagement of both brakes 16 and 17. As is apparent from the drawings, the engagement of both clutches 14 and 15 causes a direct connection between the carrier 21 and the drive shaft 10 to be established and consequently the driven shaft 11 is driven in unison with the drive shaft 10. The engagement of the clutches 14 and 15 causes the sun gear 23, the carrier 21 and the sun gear 18 all to be driven forwardly at engine speed. The carrier 21 and the sun gear 18 being driven forwardly at the same speed cause the planetary gear set 13 to be locked up so that all of its elements rotate in unison and since the carrier 27 of the gear set 12 is connected to the ring gear 19, the carrier 27 is also driven forwardly at the same speed as the sun 23. This effects a locking up of the first planetary gear set 12.

Reverse drive through the transmission is established upon the simultaneous engagement of the clutch 14 and the brake 17 while the clutch 15 and the brake 16 are disengaged. During reverse drive a forward rotation of the sun gear 18 tends to drive the carrier 21 forwardly just the same as during the reduced forward speed drives. The simultaneous engagement of the clutch 14 and the brake 17, however, causes the ring gear 19 to be driven reversely so that the net effect on the carrier 21 is to cause it, together with the driven shaft 11, to rotate reversely. The forward rotation of the sun gear 23 causes the pinions 26 to rotate reversely about their own axes and these pinions, being in mesh with the pinions 25, effect a forward rotation of the latter pinions about their own axes. The forward axial rotation of the pinions 25 causes these pinions to planetate reversely within the stationary ring gear 24 and as a result the carrier 27 is driven reversely. The carrier 27, being directly connected with the ring gear 19, causes the latter to also be driven reversely, so that the net effect on the carrier 21, which is acted upon by both the sun gear 18 and the ring gear 20 is to cause the carrier 21 and driven shaft 11 to be driven reversely.

It is contemplated that numerous changes and modifications may be made in the present invention without departing from the spirit or scope thereof.

I claim:

1. In a transmission, the combination of a drive shaft, a driven shaft, planetary gearing drivingly connected between said shafts and consisting of a plurality of relatively rotatable elements, a first one of said elements being connected to rotate with said drive shaft under all conditions, a pair of clutches for selectively connecting two others of said elements to rotate with said drive shaft, a pair of brakes for selectively holding two different ones of said elements stationary, and another two of said elements being connected together under all conditions, said brakes and clutches being selectively operable in pairs to selectively hold said two different ones of said elements stationary and connect said two other elements to said drive shaft for selectively establishing five different driving ratios between said shafts.

2. In a transmission, the combination of a drive shaft, a driven shaft, planetary gearing drivingly connected between said shafts and consisting of a plurality of relatively rotatable elements, a first one of said elements being connected to rotate with said drive shaft under all conditions, a pair of clutches for selectively connecting two others of said elements to rotate with said drive shaft, a pair of brakes for selectively holding two different ones of said elements stationary, and another two of said elements being connected together under all conditions, said brakes and clutches being selectively operable in pairs to selectively hold said two different ones of said elements stationary and connect said two other elements to said drive shaft for selectively establishing four different forward driving ratios and a reverse driving ratio between said shafts.

3. In a transmission, the combination of a drive shaft, a driven shaft, two sets of planetary gearing drivingly connected between said shafts, one of said sets of planetary gearing including a plurality of relatively rotatable elements, a first one of said elements being connected to rotate in unison with said drive shaft, a second one of said elements being connected to rotate in unison with said driven shaft and a third one of said elements comprising a reaction element, said second planetary gear set including a pair of relatively rotatable reaction elements and an output element, said output element being connected to rotate in unison with said reaction element of said first planetary gear set, and means for simultaneously braking said pair of reaction elements of said second planetary gear set to thereby hold said reaction element of said first planetary gear set stationary and complete a power train between said shafts.

4. In a transmission, the combination of a drive shaft, a driven shaft, a first planetary gear set including a sun gear connected with said drive shaft, a carrier connected with said driven shaft and a reaction ring gear, a second planetary gear set including reaction sun and ring gears and also including a carrier connected to rotate in unison with said reaction ring gear of said first planetary gear set, and means for simultaneously braking said reaction sun and ring gears of said second planetary gear set to thereby hold said reaction ring gear of said first planetary gear set stationary so as to complete a power train between said shafts.

5. In a transmission, the combination of a drive shaft, a driven shaft, a first planetary gear set including a sun gear connected with said drive shaft, a carrier connected with said driven shaft and a reaction ring gear, a second planetary gear set including reaction sun and ring gears, a second sun gear, and also including a carrier connected to rotate in unison with said reaction ring gear of said first planetary gear set, means for simultaneously braking said reaction sun and ring gears of said second planetary gear set to thereby hold said reaction ring gear of said first planetary gear set stationary so as to complete a forward power train between said shafts, and means for simultaneously braking the reaction ring gear of said second planetary gear set and connecting said second sun gear of said second planetary gear set to said drive shaft to thereby complete a reverse power train between said shafts.

6. In a transmission, the combination of a drive shaft, a driven shaft, a first planetary gear set including a sun gear connected with said drive shaft, a carrier connected with said driven shaft and a reaction ring gear, a second planetary gear set including reaction sun and ring gears, a second sun gear, and also including a carrier connected to rotate in unison with said reaction ring gear of said first planetary gear set, means for simultaneously braking said reaction sun and ring gears of said second planetary gear set to thereby hold said reaction ring gear of said first planetary gear set stationary so as to complete a forward power train between said shafts, and means for simultaneously braking the reaction sun gear of said second planetary gear set and connecting said second sun gear of said second planetary gear set to said drive shaft to thereby complete a relatively higher forward speed power train between said shafts.

7. In a transmission, the combination of a drive shaft; a driven shaft; a first set of planetary gearing having an input element connected to rotate in unison with said drive shaft, an output element connected to rotate in unison with said driven shaft and a reaction element; a second set of planetary gearing having an input element selectively connectible with the output element of said first set of planetary gearing or with said drive shaft, a pair of selectively operable reaction elements, and an output element connected to rotate in unison with the reaction element of said first set of planetary gearing; a plurality of different driving ratios being selectively establishable between said shafts upon the selective connection of the input element of said second set of planetary gearing with said drive shaft or with the output element of said first set of planetary gearing and the selective operation of the reaction elements of said second set of planetary gearing.

8. In a transmission, the combination of a drive shaft; a driven shaft; a first set of planetary gearing having an input sun gear connected to rotate in unison with said drive shaft, an output planet gear carrier connected to rotate in unison with said driven shaft, and a reaction ring gear; a second set of planetary gearing having an input sun gear selectively connectible with the output carrier of said first set of planetary gearing or with said drive shaft, a pair of selectively operable reaction sun and ring gears, and an output carrier connected to rotate in unison with the reaction ring gear of said first set of planetary gearing; a plurality of different driving ratios being selectively establishable between said shafts upon the selective connection of the input sun gear of said second set of planetary gearing with said drive shaft or with the output carrier of said first set of planetary gearing and the selective operation of the reaction sun and ring gears of said second set of planetary gearing.

9. In a transmission, the combination of a drive shaft; a driven shaft; a first planetary gear set including an input sun gear directly connected with said drive shaft, an output carrier directly connected with said driven shaft and a reaction ring gear; a second planetary gear set including an output carrier connected with the reaction ring gear of said first planetary gear set, a reaction ring gear, a reaction sun gear and input sun gear; a first brake for the reaction ring gear of said second planetary gear set; a second brake for the reaction sun gear of said second planetary gear set; said brakes being effective upon the simultaneous engagement thereof to lock up said second planetary gear set and thereby hold said reaction ring gear of said first planetary gear set stationary to provide a forward driving ratio between said shafts; and a clutch for connecting the input sun gear of said second planetary gear set with the carrier of said first planetary gear set and effective upon engagement of said second brake to cause the reaction ring gear of said first planetary gear set to be driven to thereby vary the forward driving ratio between said shafts.

10. In a transmission, the combination of a drive shaft; a driven shaft; a first planetary gear set including an input sun gear directly connected with said drive shaft, an output carrier directly connected with said driven shaft and a reaction ring gear; a second planetary gear set including an output carrier connected with the reaction ring gear of said first planetary gear set, a reaction ring gear, a reaction sun gear and an input sun gear; a first brake for the reaction ring gear of said second planetary gear set; a second brake for the reaction sun gear of said second planetary gear set; said brakes being effective upon the simultaneous engagement thereof to lock up said second planetary gear set and thereby hold said reaction ring gear of said first planetary gear set stationary to provide a forward driving ratio between said shafts; and a clutch for connecting the input sun gear of said second planetary gear set with said drive shaft and effective upon engagement of said second brake to cause the reaction ring gear of said first planetary gear set to be driven to thereby vary the forward driving ratio between said shafts.

11. In a transmission, the combination of a drive shaft; a driven shaft; a first planetary gear set including an input sun gear directly connected with said drive shaft, an ouput carrier directly connected with said driven shaft and a reaction ring gear; a second planetary gear set including an output carrier connected with the reaction ring gear of said first planetary gear set, a reaction ring gear, a reaction sun gear and an input sun gear; a first brake for the reaction ring gear of said second planetary gear set; a second brake for the reaction sun gear of said second planetary gear set; said brakes being effective upon the simultaneous engagement thereof to lock up said second planetary gear set and thereby hold said reaction ring gear of said first planetary gear set stationary to provide a forward driving ratio between said shafts; a clutch for connecting the input sun gear of said second planetary gear set with the carrier of said first planetary gear set and effective upon engagement of said second brake to effect a forward rotation of the reaction ring gear of said first planetary gear set to thereby increase the forward driving ratio between said shafts; and a clutch for connecting the input sun gear of said second planetary gear set with said drive shaft and effective upon engagement of said second brake to effect a higher speed forward rotation of the reaction ring gear of said first planetary gear set to thereby still further increase the forward driving ratio between said shafts.

12. In a transmission, the combination of a drive shaft; a driven shaft; a first planetary gear set including an input sun gear directly connected with said drive shaft, an output carrier directly connected with said driven shaft and a reaction ring gear; a second planetary gear set including an output carrier connected with the reaction ring gear of said first planetary gear set, a reaction ring gear, a reaction sun gear and an input sun gear; a first brake for the reaction ring gear of said second planetary gear set; a second brake for the reaction sun gear of said second planetary gear set; said brakes being effective upon the simultaneous engagement thereof to lock up said second planetary gear set and thereby hold said reaction ring gear of said first planetary gear set stationary to provide a forward driving ratio between said shafts; and a clutch for connecting the input sun gear of said second planetary gear set with said drive shaft and effective upon engagement of said first brake to effect a reverse rotation of the reaction ring gear of said first planetary gear set to thereby complete a reverse driving ratio between said shafts.

13. In a transmission, the combination of a drive shaft, a driven shaft, a planetary gear set drivingly connected between said shafts, and including an input element connected for rotation in unison with said drive shaft, an output element connected for rotation in unison with said driven shaft and a reaction element, selectively operable means for holding said reaction element stationary to complete a relatively low forward power train between said shafts, means for effecting a forward rotation of said reaction element to thereby complete a relatively high forward power train between said shafts, and means for connecting said output element directly with said drive shaft to thereby complete a direct drive between said shafts.

14. In a transmission, the combination of a drive shaft, a driven shaft, a planetary gear set drivingly connected between said shafts, and including an input element connected for rotation in unison with said drive shaft, an output element connected for rotation in unison with said driven shaft and a reaction element, selectively operable means for holding said reaction element stationary to complete a relatively low forward power train between said shafts, means for effecting a forward rotation of said reaction element to thereby complete a relatively high forward power train between said shafts, means for connecting said output element directly with said drive shaft to thereby complete a direct forward drive between shafts, and means for effecting a reverse rotation of said reaction element to complete a reverse drive between said shafts.

15. In a transmission, the combination of a drive shaft, a driven shaft, a first planetary gear set drivingly connected between said shafts and including an input element connected for rotation in unison with said drive shaft, an output element connected for rotation in unison with said driven shaft and a reaction element, a second planetary gear set for controlling said reaction element, said second set including a plurality of elements, one of said elements being connected for rotation in unison with said reaction element, selectively operable engaging means associated with said second planetary gear set and selectively engageable with others of said elements of said second planetary gear set for controlling said reaction element to thereby complete a plurality of forward power trains and a reverse power train between said drive and driven shafts.

16. In a transmission, the combination of a drive shaft, a driven shaft, a planetary gear set drivingly connected between said shafts and including an input element connected for rotation in unison with said drive shaft, an output element connected for rotation in unison with said driven shaft and a reaction element, a second planetary gear set for controlling said reaction element and including a pair of reaction elements, an input element and an output element directly connected with the reaction element of said first planetary gear set, a pair of selectively operable brakes respectively provided for the reaction elements of said second planetary gear set, a pair of selectively operable clutches for selectively connecting the input element of said second planetary gear set with said drive shaft or with said driven shaft, all of said brakes and clutches being selectively operable in pairs to effect different reduced forward rotations or a reverse rotation of the reaction element of said first planetary gear set or for directly connecting said shafts to thereby complete a plurality of different forward drives and a reverse drive between said shafts.

References Cited in the file of this patent
UNITED STATES PATENTS

| Number | Name | Date |
|---|---|---|
| 782,547 | Coffee | Feb. 14, 1905 |
| 1,404,675 | Wilson | Jan. 24, 1922 |
| 2,127,655 | Stromquist | Aug. 23, 1938 |
| 2,164,729 | Wilson | July 4, 1939 |
| 2,395,459 | Carnagua | Feb. 26, 1946 |
| 2,546,378 | Winther | Mar. 27, 1951 |
| 2,551,746 | Iavelli | May 8, 1951 |